Oct. 8, 1968        W. A. CALDWELL         3,405,215
        METHOD OF PRODUCING THERMOPLASTIC ORNAMENTS
Filed Oct. 16, 1964                    2 Sheets-Sheet 1

INVENTOR.
W. A. CALDWELL
BY Young & Quigg
ATTORNEYS

United States Patent Office 3,405,215
Patented Oct. 8, 1968

3,405,215
METHOD OF PRODUCING THERMOPLASTIC ORNAMENTS
William A. Caldwell, Bartlesville, Okla., assignor to Phillips Petroleum Company, a corporation of Delaware
Filed Oct. 16, 1964, Ser. No. 404,330
9 Claims. (Cl. 264—263)

This invention relates to the produciton of ornamental objects from thermoplastic materials.

Ornamental objects are produced in accordance with this invention by positioning a molten thermoplastic material in a container having an open top. The container is then inverted so that the thermoplastic material tends to flow out by gravity. The material is cooled as it flows from the container so that a solid object is formed which has at least one base with a plurality of legs extending therefrom. In one specific embodiment of this invention, the thermoplastic material is permitted to flow from the container to a surface as it is cooled so that a solid object is formed which has a base and a top with a plurality of legs extending therebetween. The resulting objects can be used for such purposes as ornaments in aquariums, paperweights, and lamp bases.

Accordingly, it is an object of this invention to provide a method of forming ornamental objects from thermoplastic materials.

A further object is to provide ornamental objects having at least one base with a plurality of legs extending therefrom.

Other objects, advantages and features of the invention should become apparent from the following detailed description, taken in conjunction with the accompanying drawing in which:

FIGURE 3 illustrates a portion of apparatus which can be employed to form ornamental lamp bases.

FIGURE 4 illustrates a spherical ornamental object produced in accordance with this invention.

Figure 1:
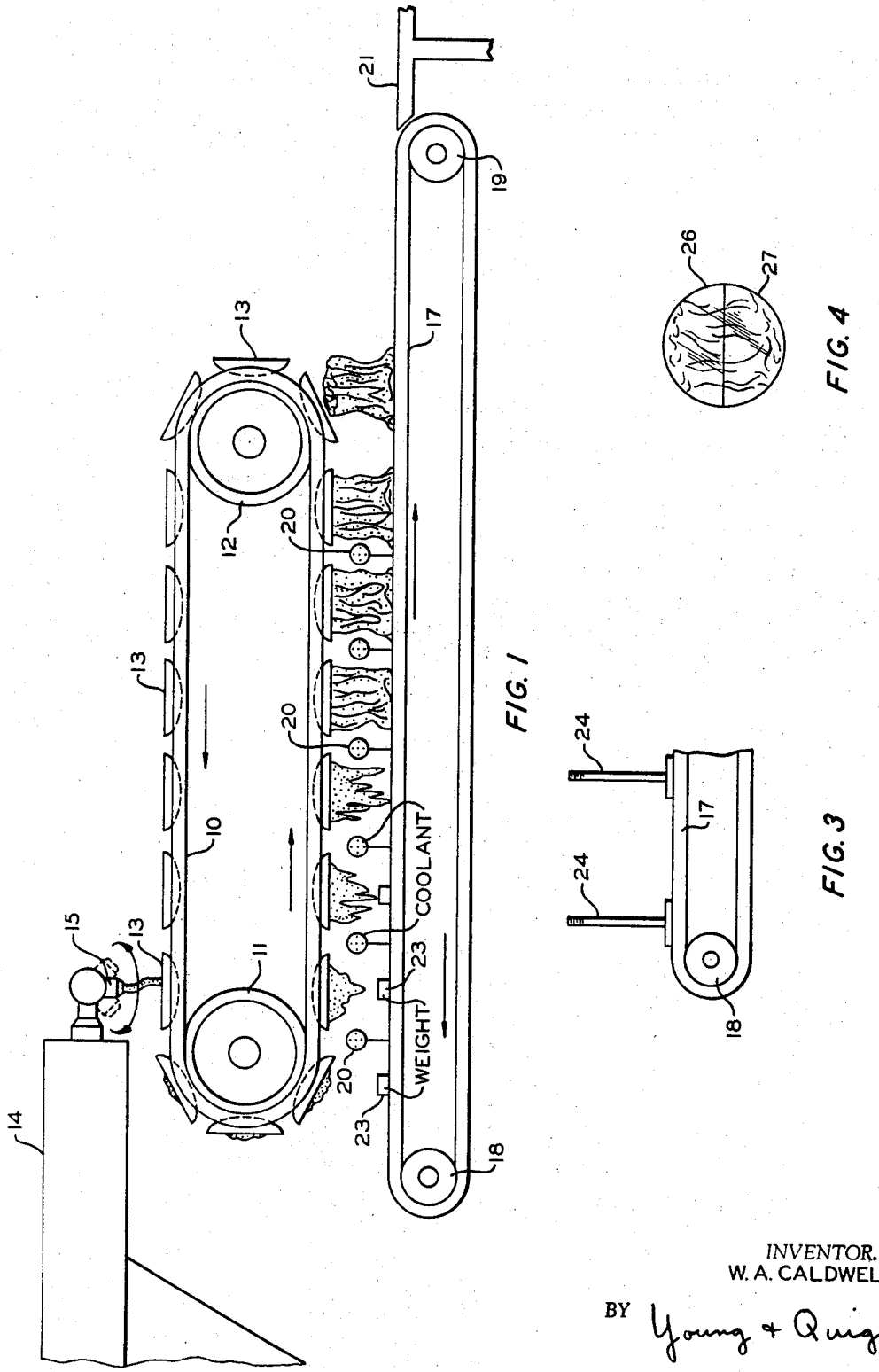
FIGURE 1 is a schematic representation of an embodiment of apparatus employed to form the ornamental objects of this invention.

Referring now to the drawing in detail and to FIGURE 1 in particular, there is shown apparatus which can be employed to form ornamental objects by the process of this invention. A continuous conveyor belt 10 extends between wheels 11 and 12, at least one of which is rotated by a suitable drive means, not shown. A plurality of hollow containers 13 are mounted on the surface of conveyor belt 10. A conventional thermoplastic extruder 14 is positioned above conveyor belt 10. This conveyor is provided with a nozzle 15 which can be rotated either manually or by suitable drive mechanism, not shown. A stream of molten thermoplastic material is emitted from nozzle 15 so as to fill or partially fill molds 13 as they are transported beneath the extruder. The extruder nozzle can be manipulated so that either a solid mass of molten material is deposited randomly or in a pattern in the bottom of the molds.

Immediately after the thermoplastic material is positioned in the molds, the molds are moved by belt 10 so as to be inverted over a second conveyor belt 17. Belt 17 extends about guide wheels 18 and 19, at least one of which is driven by a suitable means, not shown. Conveyor belt 17 moves at the same speed as conveyor belt 10 so that adjacent sectors of the belts move together. The thermoplastic material tends to flow from the molds by gravity as the molds move along above conveyor belt 17. The thermoplastic material tends to solidify as it flows downwardly into engagement with belt 17. The rate at which the thermoplastic material is solidified can be increased by directing a stream of coolant against the thermoplastic material as it flows from the molds. This can be accomplished, for example, by suitable spray heads 20 which direct streams of air or water against the thermoplastic material. The initial temperature of the molten thermoplastic material, the speed of the conveyors, and the rate of addition of coolant can be adjusted so that the material is solidified and released from the molds by the time the molds move upwardly adjacent guide wheel 12. The resulting solidified objects are then carried by belt 17 to a receiving platform 21.

Figure 2:
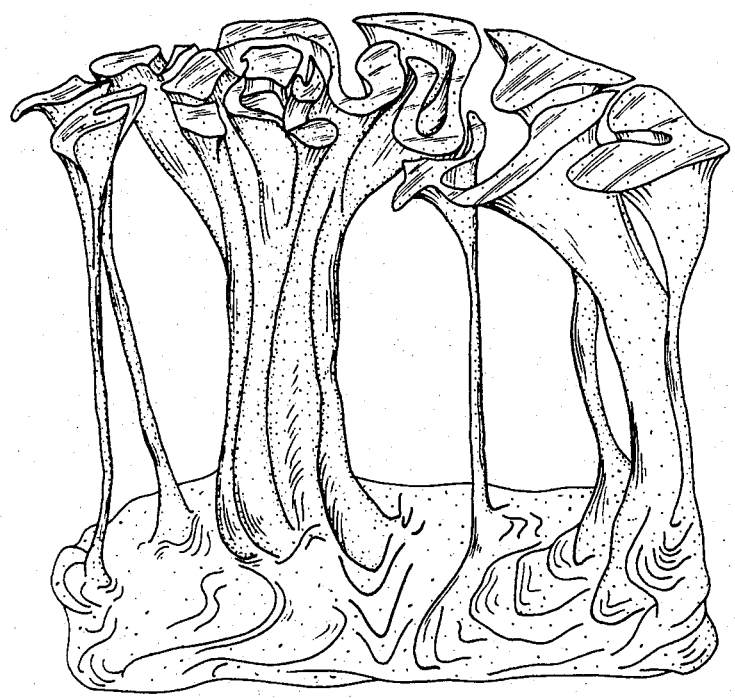
FIGURE 2 illustrates a typical object formed by the apparatus of FIGURE 1.

A typical solid object produced by the apparatus of FIGURE 1 is illustrated in FIGURE 2. This particular object is formed when a ribbon of molten thermoplastic material is deposited randomly on the bottom of the molds. This results in empty spaces in the bottom of the molds, which produces voids in the top of the object, as shown in FIGURE 2. The base of the object results from the flowing material solidifying on the surface of conveyor belt 17. The legs extending between the top and base are formed as the polymer flows from the mold to the base. If a solid mass of polymer is positioned in the molds, the resulting object has a top which is substantially solid, but which has a number of legs which extend downwardly to the base.

One particular use of objects having the configuration shown in FIGURE 2 is as ornaments in aquariums. Since many thermoplastic materials, particularly those formed of olefin polymers, have a specific gravity less than 1, it is desirable to incorporate a weight in the base of the object so that the object will remain on the bottom of the aquarium. This is readily accomplished in the system of FIGURE 1 by positioning weights 23 on conveyor belt. The weights are thus imbedded in the polymer as it flows downwardly from molds 13.

The objects produced in accordance with this invention can be employed as bases for lamps. For such use, it is generally desirable to position a relatively large quantity of polymer in the center of the mold so that a central leg is formed through which the lamp cord can extend. While it is possible to drill a suitable hole through this central leg after the ornament is formed, a more convenient procedure is to imbed a tube within the ornament as it is formed. This can be accomplished by the apparatus shown in FIGURE 3, wherein tubes 24 are positioned initially on conveyor belt 17 so that the molten polymer actually flows about and covers the rods as the ornaments are formed.

FIGURE 4 illustrates an object of generally spherical configuration which can be formed by the process of this invention. Molten thermoplastic is first positioned in a hemispherical hollow, transparent container 26. This container is then inverted and secured to a similar container 27. The polymer flows downwardly from container 26 into container 27 as it is cooled so that an object similar to that shown in FIGURE 2 is formed inside the transparent containers. The two containers are secured to one another by suitable adhesives or thermal bonding so that a transparent ball is formed having an ornamental object therein.

The apparatus illustrated in FIGURE 1 is particularly useful in forming the ornamental objects in an automatic or semi-automatic fashion. In the simplest form of the invention, thermoplastic material can be positioned in a hollow container which is then inverted over a surface, such as a table top. The material cools as it flows downwardly from the container and usually will remain on the surface when the container is subsequently lifted. It should be evident that the molds can be of any desired configuration, depending upon the desired configuration of the top of the final object. Similarly, the lower surface on which the object is formed can be of any desired configuration. In some operations, it is not necessary to employ a lower surface in the forming of the object. By the use of an adequate amount of coolant, it is possible to cause the object to solidify as the legs flow downwardly from the mold. This produces an object having a single base with a plurality of legs extending therefrom. It should be evident that various types of thermoplastic materials of any desired color or colors can be used to form the objects of this invention.

While this invention has been described in conjunction with presently preferred embodiments, it should be evident that it is not limited thereto.

What is claimed is:

1. The method of forming an ornamental object which comprises positioning a molten thermoplastic material in a container having an open top, and inverting the container over a surface so that the thermoplastic material will flow from the container to the surface as the material is cooled, thereby forming a solid object having a base and top connected by a plurality of legs.

2. The method of claim 1 wherein the molten thermoplastic material is positioned in the container so as to form a solid mass in the bottom thereof.

3. The method of claim 1 wherein the molten thermoplastic material is positioned in the container so as to engage only a portion of the bottom of the container, whereby the resulting solid object is partially open at the top.

4. The method of claim 1, further comprising positioning a weight on the surface prior to inverting the container over the surface so that the weight is embedded in the solid object.

5. The method of claim 4 wherein the weight is a hollow tube positioned so as to extend from the base to the top of the solid object.

6. The method of forming an ornamental object which comprises positioning a molten thermoplastic material in a container having an open top, inverting the container, and cooling the thermoplastic material as it flows to the surface so that a solid object is formed which has a base and a top connected by a plurality of legs.

7. The method of claim 6 wherein the thermoplastic material is cooled by blowing a stream of fluid thereon.

8. The method of forming an ornamental object which comprises partially filling a first transparent container having an open top with a molten thermoplastic material, attaching a second transparent container having an open top to the first container so as to form a closed container, and inverting the first container so that the thermoplastic material will flow downwardly into the second container as the material is cooled, thereby forming a solid object having a base in the second container and a top in the first container and legs extending therebetween.

9. The method of forming an ornamental object which comprises positioning a molten thermoplastic material in a container having an open top, inverting the container so that the thermoplastic material will flow from the container, and cooling the thermoplastic material as it flows from the container so that a solid object is formed which has a base with a plurality of legs extending therefrom.

References Cited

UNITED STATES PATENTS

| | | | |
|---|---|---|---|
| 2,543,981 | 3/1951 | Murao et al. | 264—279 X |
| 3,046,178 | 7/1962 | Tupper | 161—7 X |
| 3,296,347 | 1/1967 | Fuentes | 264—279 X |
| 1,626,859 | 5/1927 | Morgan | 264—279 X |

FOREIGN PATENTS 935,103    8/1963    Great Britain.

ROBERT F. WHITE, *Primary Examiner.*

KEN J. HOVET, *Assistant Examiner.*